Figure 1:
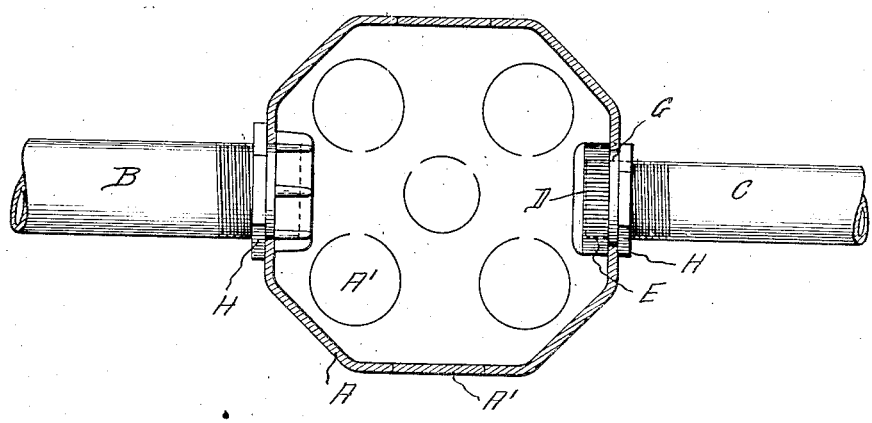

P. E. C. SATER.
BUSHING FOR OUTLET BOXES.
APPLICATION FILED AUG. 16, 1920.

1,394,942.

Patented Oct. 25, 1921.

Inventor
P. E. C. Sater
By
Hull Smith Porter & West
Attys.

UNITED STATES PATENT OFFICE.

PETER E. C. SATER, OF CLEVELAND, OHIO.

BUSHING FOR OUTLET-BOXES.

1,394,942.      Specification of Letters Patent.      Patented Oct. 25, 1921.

Application filed August 16, 1920. Serial No. 404,006.

*To all whom it may concern:*

Be it known that I, PETER E. C. SATER, a citizen of the United States, residing at Cleveland, in the county of Cuyahoga and State of Ohio, have invented a certain new and useful Improvement in Bushings for Outlet-Boxes, of which the following is a full, clear, and exact description, reference being had to the accompanying drawings.

This invention relates generally to electrical outlet boxes and more particularly to a universal bushing to be used in connection with the same.

At the present time there are two standard sizes of pipes or conduits for carrying electric conductors, one pipe being three-fourths of an inch in diameter, and the other one-half an inch in diameter.

Inasmuch as there are two standard sizes of pipes or conduits all outlet boxes are made with either three-quarter inch knockouts or one-half inch knockouts to provide openings to receive the said pipes or conduits.

These outlet boxes are made of thin metal and when manufactured the openings are not completely punched but as a matter of fact the metal is severed for the greater portion of a complete circle and is called a knockout and the opening is quickly and easily made by knocking out the metal at the point desired.

This knocking out of the metal does not take place until the box is ready to be installed and have the pipes or conduits connected therewith.

In ordinary practice the end of the pipe or conduit is projected through the opening, and a bushing is screwed upon the inwardly projecting end of said pipe and a lock nut is then screwed upon the pipe and brought to bear against the exterior of the outlet box thus securely connecting the pipe to the box; and a perfectly good tight joint at this point is required by all building codes and also by the requirements of all underwriters.

It frequently happens that a contractor, for one reason or another, has a supply of three-quarter inch boxes, and one-half inch pipes; or he may have half inch boxes, and three-quarter inch pipes; and in either event these mismatched pipes and boxes cannot be connected up except at the expenditure of a great deal of time and labor as in one instance an excessive number of lock nuts would have to be employed and even then the connection is loose and unsatisfactory, and in the other instance, it is necessary to ream out the smaller opening in order to receive the larger pipe.

The object of my invention is to provide a universal bushing which will eliminate these difficulties, and with the use of my improved bushing the contractor can carry only one size of box, namely three-quarter inch size and can quickly and easily fit into it, either three-quarter inch pipes, or half inch pipes as may be desired, it being understood that for the three-quarter inch pipe, the standard three-quarter inch bushing will be used whereas for the half inch pipe my improved bushing will be employed; and it will also be undestood that in case a half inch pipe should be used in connection with a half inch box my improved bushing can be employed for this purpose also.

With these objects in view my invention consists in making the bushing with an exterior shoulder adapted to fit the three-quarter inch hole of an outlet box, the interior threaded opening of said bushing being adapted to receive the threaded end of a half inch pipe.

The invention consists also in certain details of construction hereinafter fully described and pointed out in the appended claims.

Figure 2:
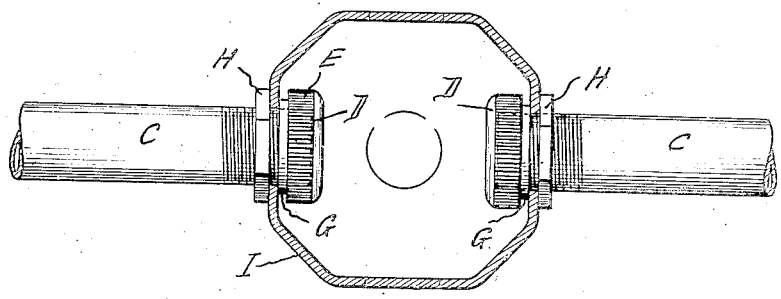
Figure 3:
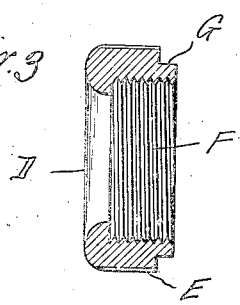
Figure 4:
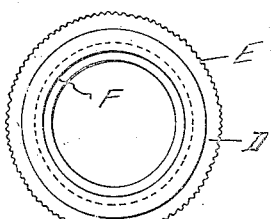

In the drawings forming a part of this specification Figure 1 is a view showing an outlet box having a three-quarter inch pipe and a one-half inch pipe connected thereto; Fig. 2 is a view of an outlet box having a one-half inch pipe connected thereto; Fig. 3 is a sectional view of my improved bushing and Fig. 4 is an end view of the same.

In carrying out my invention I employ the ordinary outlet box A having the knockout portions A'. B indicates the pipe or conduit of the three-fourth inch size and C indicates the pipe or conduit of the half inch size. D indicates my improved universal bushing having the milled end E to facilitate its operation. This bushing is tapped with a half inch threaded opening F and upon the exterior and remote from the milling, this bushing is formed with a shoulder G sized to snugly fit into the three-quarter inch opening of the outlet box.

In case it is desired to use a half inch pipe in connection with the outlet box having the three-quarter inch opening the threaded end of the pipe C carrying the lock nut H thereon is projected through the opening and the bushing D screwed upon said inwardly projecting end, the exterior shoulder of the bushing seating in the opening and centering both the bushing and the pipe, the lock nut H is drawn up so as to bind firmly against the exterior of the box.

By this method a perfectly tight joint is obtained between the half inch pipe and the three-quarter inch box.

In case it is desired to use a half inch pipe C in connection with a half inch box I the end of the pipe is projected through the half inch opening and my improved form of bushing is screwed thereon, the end of the bushing contacting with the inner side of the box and the lock nut is then turned up and in this manner a perfectly tight joint is obtained between the half inch pipe and the half inch box by means of my improved universal bushing and lock nut.

As previously stated, in case a three-quarter inch pipe is used in connection with a three-quarter inch box, the ordinary or standard bushing, devoid of any exterior shoulder is employed in connection with the pipe.

By the use of the bushing constructed as herein shown and described a great deal of time and labor will be saved for the reason that by its use a half inch pipe can be used in connection with either a half inch box or a three-quarter inch box, and furthermore, by use of this coupling it will only be necessary to provide one type of box, namely, the three-quarter inch size, inasmuch as either a three-quarter inch pipe or a half inch pipe can be used in connection therewith, the three-quarter inch pipe being used in connection with the standard three-quarter inch bushing, whereas by means of my improved universal bushing the half inch pipe can be used in connection with either the three-quarter inch box or half inch box.

Having thus described my invention, what I claim is:—

1. A bushing for outlet boxes having an exterior shouldered end adapted to fit into an opening in said outlet box, said bushing being threaded internally, said internally threaded portion being adapted to receive he threaded end of a conduit of less diameter than the opening in said outlet box.

2. A bushing reduced at one end providing a shoulder adapted to fit into an opening in an outlet box, and internally threaded to receive a conduit of less diameter than said outlet box opening.

3. A bushing having an internal diameter of a size to fit a definite sized conduit, and having a portion of the exterior of said bushing of a diameter to fit within an opening of an outlet box, and another portion which is larger than said opening, said opening being of a size to receive a conduit of greater diameter than that of the first mentioned conduit.

In testimony whereof, I hereunto affix my signature.

PETER E. C. SATER.